United States Patent
Kuo et al.

(10) Patent No.: US 7,061,757 B2
(45) Date of Patent: Jun. 13, 2006

(54) PORT REPLICATOR FOR PORTABLE ELECTRONIC DEVICES

(75) Inventors: Wen-Chieh Kuo, Taipei (TW); Yuan-Hua Wen, Tucheng (TW)

(73) Assignee: Uniwill Computer Corp., Chungli (TW)

( * ) Notice: Subject to any disclaimer, the term of this patent is extended or adjusted under 35 U.S.C. 154(b) by 0 days.

(21) Appl. No.: 10/902,864

(22) Filed: Aug. 2, 2004

(65) Prior Publication Data
US 2006/0023417 A1    Feb. 2, 2006

(51) Int. Cl.
*G06F 1/16* (2006.01)
(52) U.S. Cl. .................. 361/686; 439/159; 320/113; 248/920
(58) Field of Classification Search ........ 361/679–687, 361/724–727; 439/159; 320/107, 113; 710/101–103; 248/917–920
See application file for complete search history.

(56) References Cited

U.S. PATENT DOCUMENTS

| 6,222,728 | B1 * | 4/2001 | Jaggers et al. ............. 361/686 |
| 6,424,524 | B1 * | 7/2002 | Bovio et al. .............. 361/686 |
| 6,741,462 | B1 * | 5/2004 | Kamphuis et al. .......... 361/686 |

* cited by examiner

*Primary Examiner*—Hung Van Duong
(74) *Attorney, Agent, or Firm*—Alan D. Kamrath; Nikolai & Mersereau, P.A.

(57) ABSTRACT

An improved port replicator for portable electronic devices includes an angle adjustment dock which has two separated sides extended to form respectively a flange with a first bore and a connector dock located on a surface to receive transmission signals, an anchor dock having a second bore corresponding to the first bore to couple with the angle adjustment dock, and an axle running through the first bore and the second bore. The port replicator thus constructed is simple to fabricate and assemble, and is adaptable to notebook computers of varying thickness to provide a steady and secure coupling.

8 Claims, 5 Drawing Sheets

PORT REPLICATOR FOR PORTABLE ELECTRONIC DEVICES

FIELD OF THE INVENTION

The present invention relates to an improved port replicator for portable electronic devices and particularly to a port replicator connectable to notebook computers of varying thickness.

BACKGROUND OF THE INVENTION

To meet consumers' requirement for carrying convenience, slim and light have become the prevailing trend of notebook computer development. With the size of the notebook computer shrinking gradually, the capability of connecting peripheral devices and hardware expansion also is constrained. Hence many notebook computers now provide a docking port or added on circuit facilities to couple with external peripheral devices. Besides to expand hardware capacity, it also provides additional output functions.

In order to reduce overall space utilization and improve the convenience of peripheral expansion, many notebook computers provide a port replicator to couple with the connection end located on the rear or lower side to achieve expansion purpose. Refer to FIG. 1A for a conventional notebook computer 11' and a port replicator 13' that are coupled together. The connector of the conventional port replicator mostly adopts a fixed design, and cannot be coupled with the notebook computer in a movable manner. When coupled with the notebook computers of different specifications or sizes, due to different locations of the connection end of the notebook computers, different elevations occur as shown in FIGS. 1B and 1C. It causes operation inconvenience. Some could even result in impact between the machine and the desktop, and shorten the life span of the computer. Moreover, the elevation differences also alter coupling angle of the notebook computer and the port replicator, and affect signal transmission quality and could damage the connector.

Refer to FIG. 1D for a port replicator with alterable coupling angle (R.O.C. patent No. 408257) that aims to overcome the problems mentioned above. The connector 26' is mounted onto a connection dock 24' which is located on a base 22' in a turnable manner. The connection dock 24' has a pair of hooks 38' to latch a notebook computer coupling on the connection dock 24'. The connection dock 24' may be turned relative to the base 22' to adjust the angle and solve the problem caused by the elevation difference. However, the connector 26' is fixedly mounted onto the connection dock 24' and become an integrated body, angle adjustment is not flexible. Assembly and replacement of elements also are not convenient. There is still room for improvement.

SUMMARY OF THE INVENTION

Therefore the primary object of the invention is to provide an improved port replicator for portable electronic devices that has an adjustment mechanism to solve the problem of elevation difference caused by different locations of the computer connection end when various types of notebook computers are coupled with the port replicator. The invention also makes assembly and replacement simpler and more convenient.

The improved port replicator according to the invention includes an angle adjustment dock, an axle and an anchor dock. It also may be coupled with a latch means and a returning elastic element to provide an improved connectivity between the notebook computer and the port replicator.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 2:
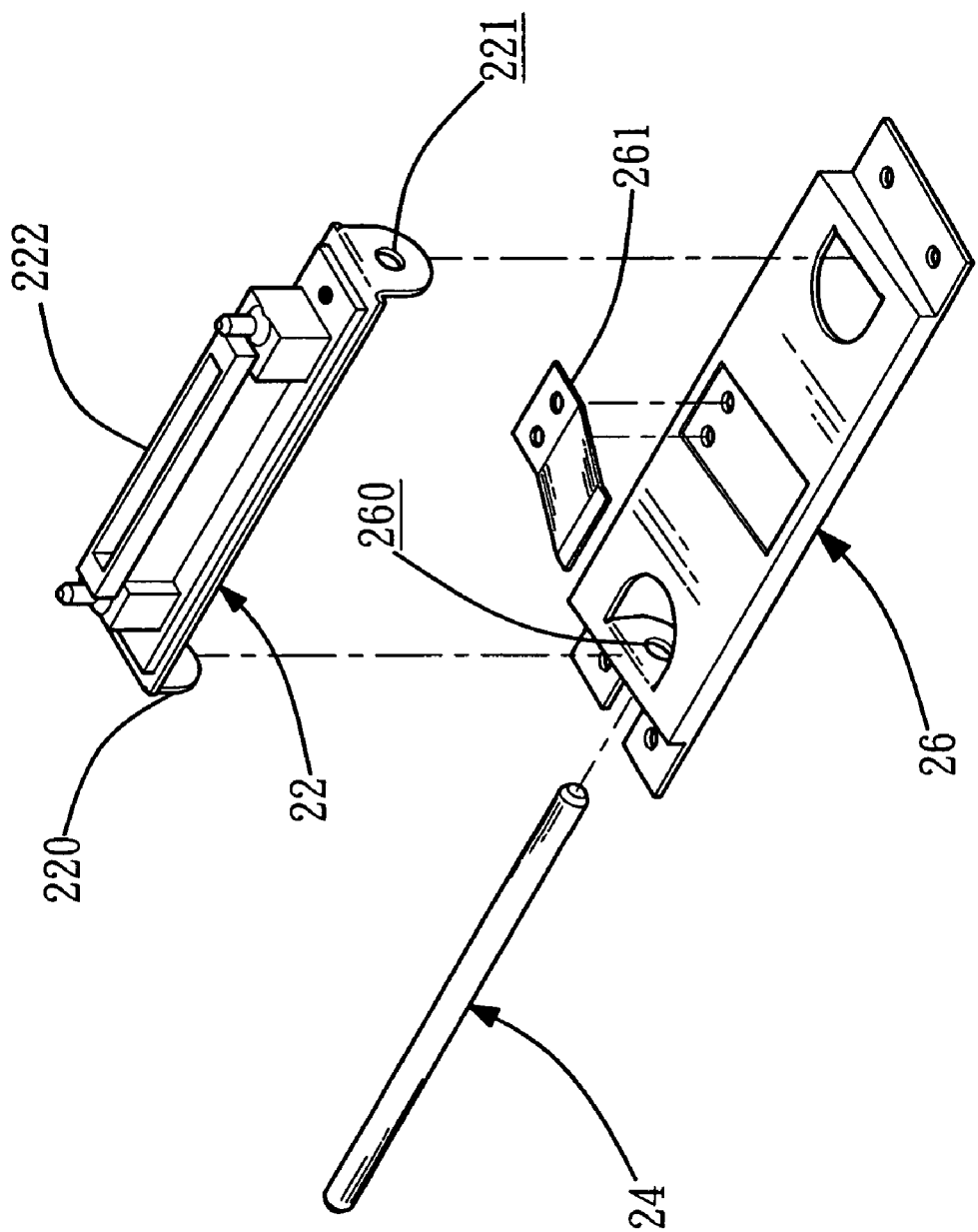
FIG. 2 is an exploded view of an embodiment of the port replicator of the invention.
Figure 3:
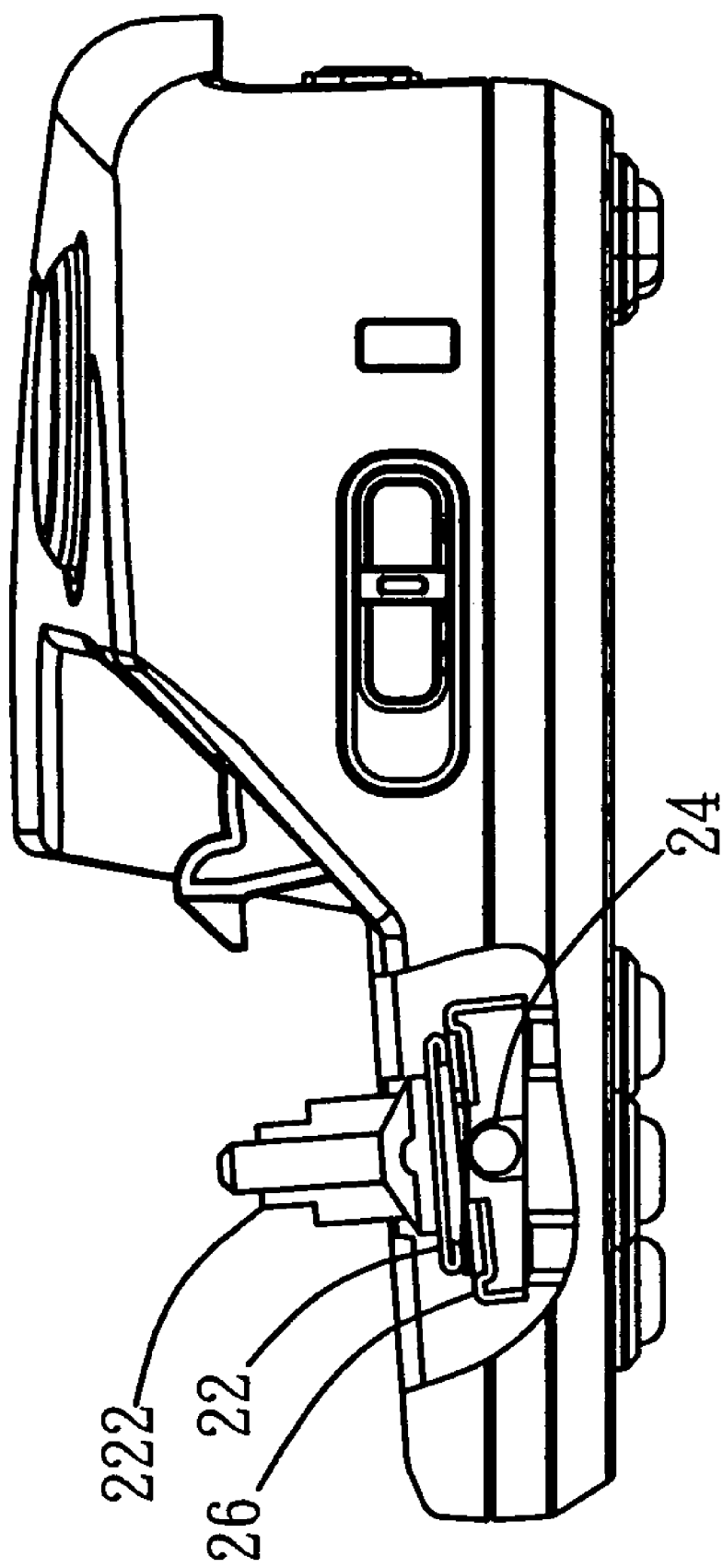
FIG. 3 is a side view of the port replicator of the invention.

Referring to FIGS. 2 and 3, the improved port replicator for portable electronic devices according to the invention includes an angle adjustment dock 22, an axle 24 and an anchor dock 26. The angle adjustment dock 22 is formed from a plate and has two flanges 220 extended downwards from two sides. Each flange 220 has a first bore 221. The angle adjustment dock 22 further has a connector dock 222 located on one surface to receive transmission signals of a portable electronic device. The anchor dock 26 has a second bore 260 corresponding to the first bore 221 of the angle adjustment dock 22. Referring to FIG. 3, the flanges 220 are coupled with the anchor dock 26 with the axle 24 running through the first bore 221 and the second bore 260 that are located on two sides of the anchor dock 26.

Figure 1A:
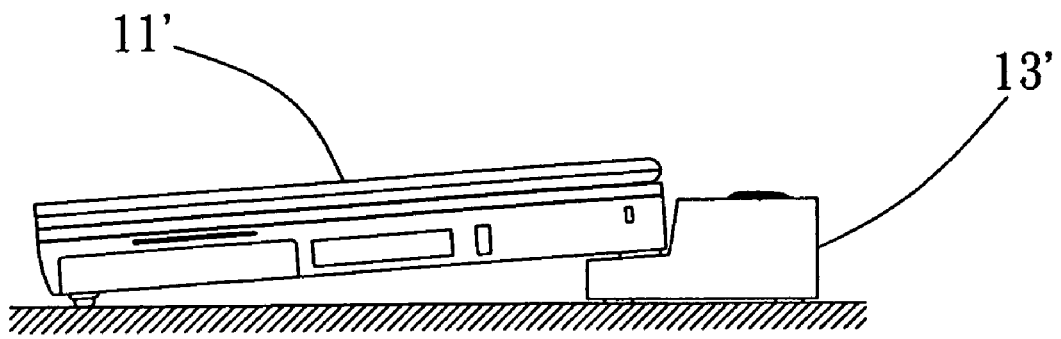
FIG. 1A is a schematic view of a conventional notebook computer coupling with a port replicator.
Figure 1B:
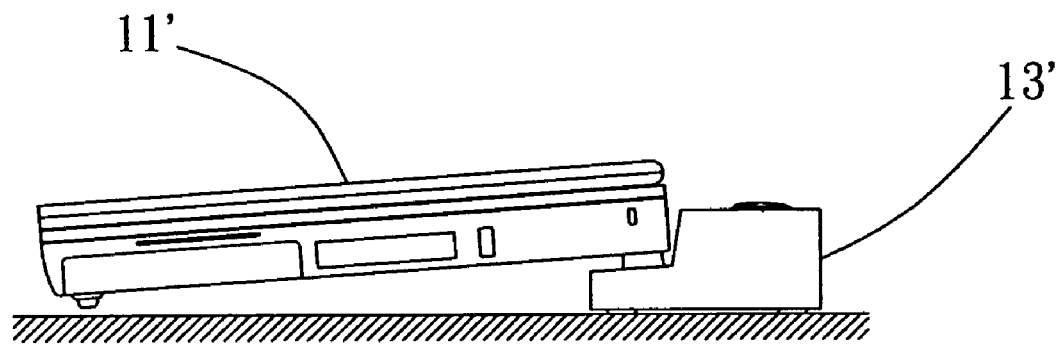
FIG. 1B is a fragmentary schematic view of a conventional notebook computer coupling with a port replicator at a varying coupling angle.
Figure 1C:
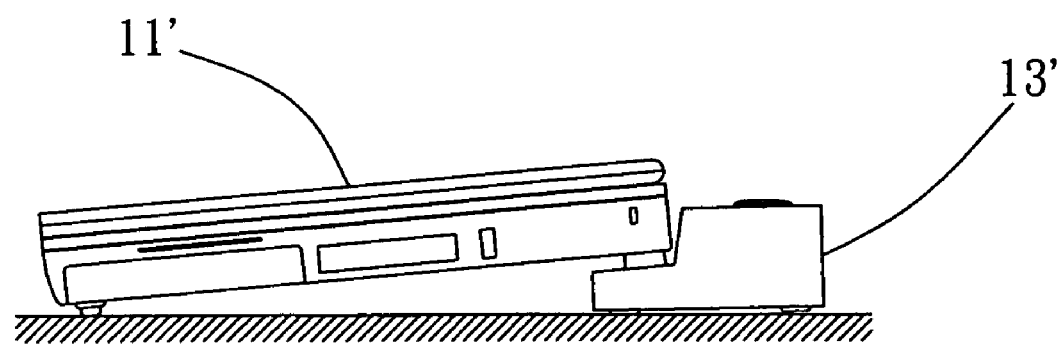
FIG. 1C is a fragmentary schematic view of a conventional notebook computer coupling with a port replicator at another coupling angle.
Figure 1D:
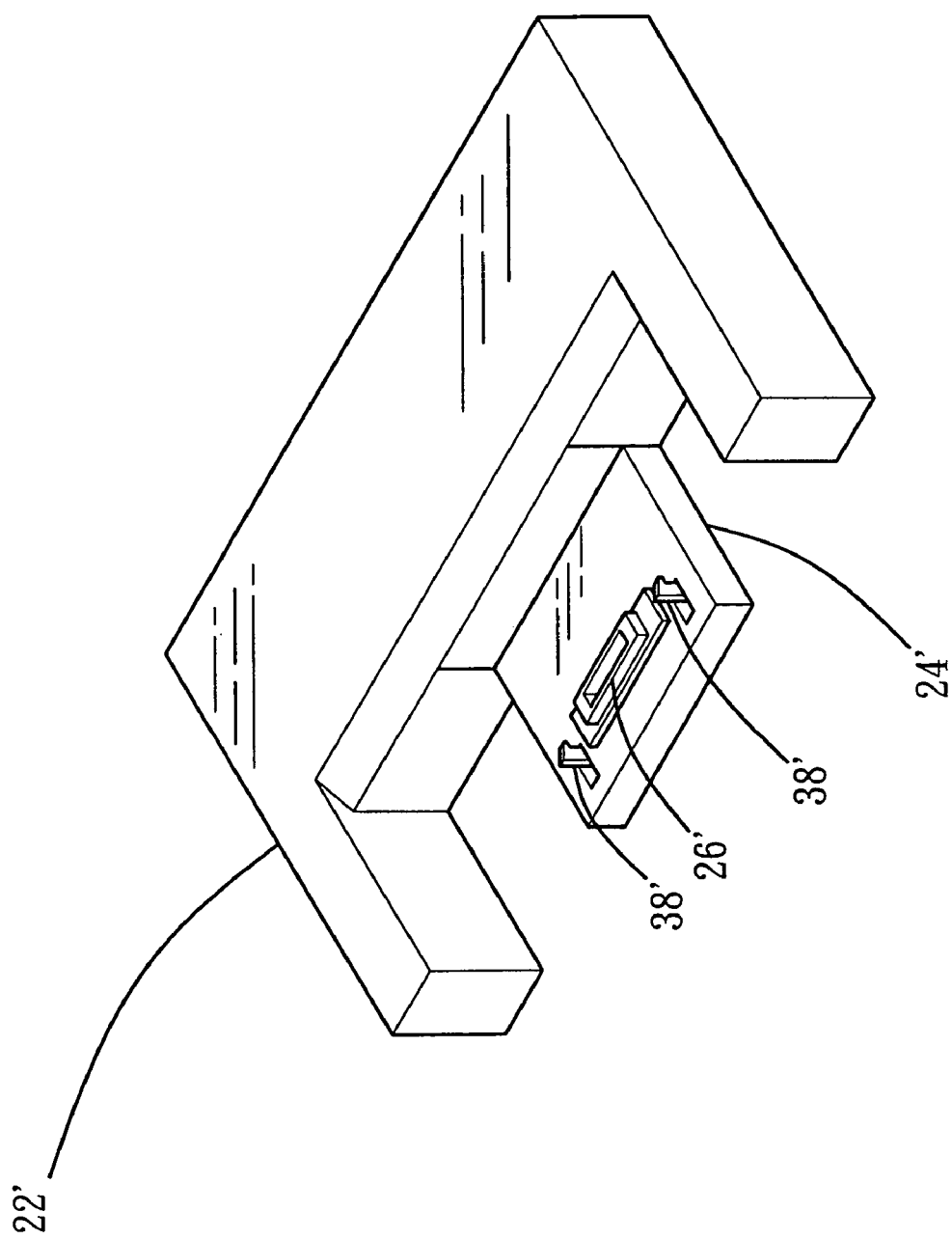
FIG. 1D is a perspective view of a conventional port replicator with an alterable coupling angle.

When the invention is coupled with the connection end of a portable electronic device (as shown in FIG. 1A), the external force loading on the port replicator drives the angle adjustment dock 22 turning about the axle 24 at an angle corresponding to the loading force (depending on the thickness and size of the portable electronic device). Thus the angle may be adjusted without creating warping or poor connection caused by elevation difference.

The anchor dock 26 may further include a returning elastic element 261 which is an elastic reed, a spring or the like. In the embodiment, a returning elastic reed is used as an example. It is formed by stamping and is riveted to the anchor dock 26. When the port replicator has been coupled with the connection end of a portable electronic device (not shown in the drawing), and the portable electronic device is removed later, the returning element 261 provides an elastic force to drive the anchor dock 22 to turn about the axle 24 to the initial angle so that the connector dock 222 is returned to its original position.

Figure 4:
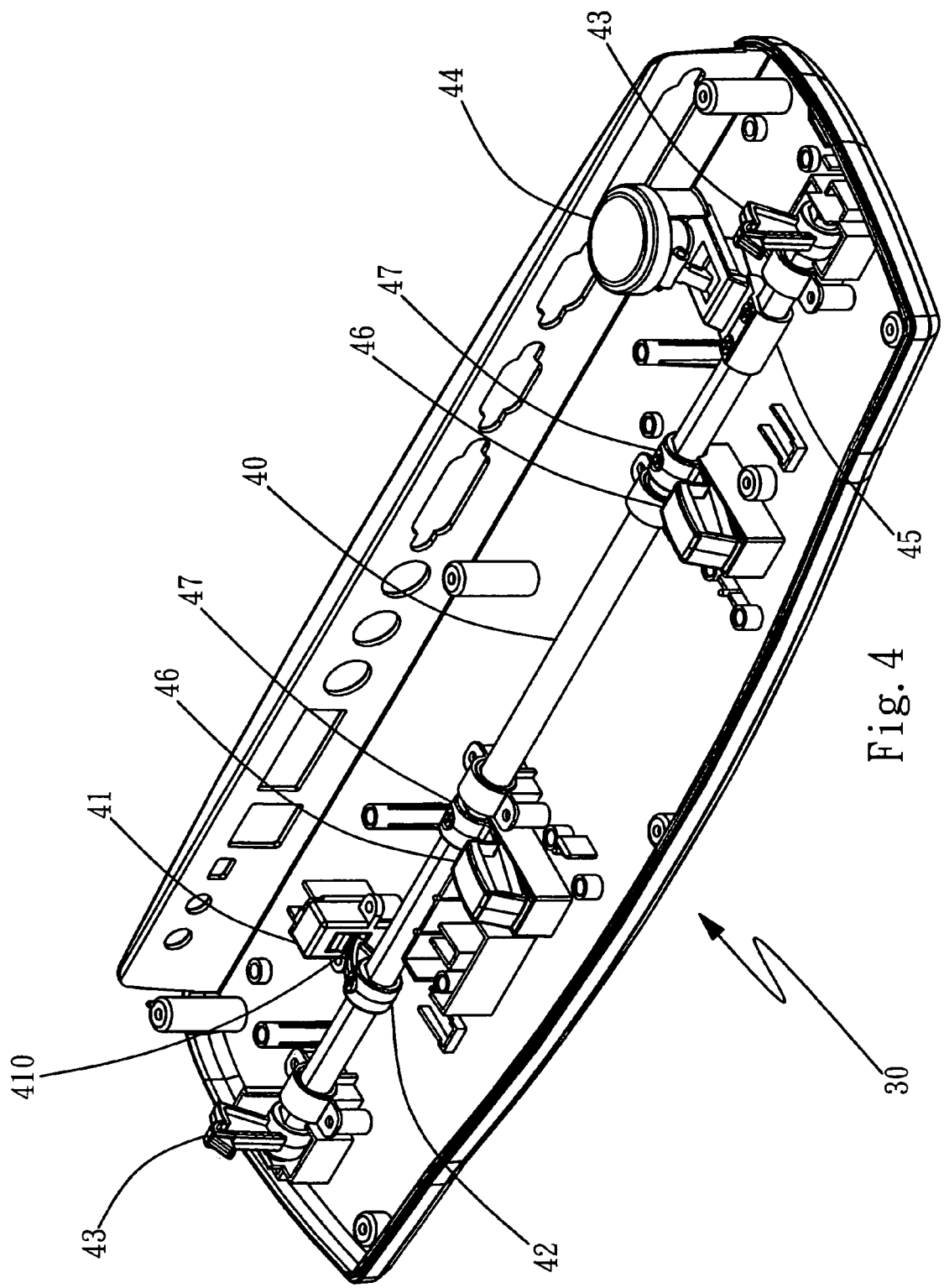
FIG. 4 is a schematic view of an embodiment of the latch means of the invention.

Refer to FIG. 4 for another embodiment of the invention that has a latch means. The latch means is located on the bottom 30 of the port replicator to achieve a more secure coupling between the portable electronic device (not shown in the drawing) and the port replicator.

The latch means includes a transmission shaft 40 which mates a braking device 41 located on the bottom 30 and is in contact with the braking device 41 through a first linkage bar 42 coupled on the transmission shaft, an anchor element 43 to execute anchor and release operation, a button 44 coupled on the transmission shaft 40 through a second linkage bar 45, and at least one ram member 46 coupled on the transmission shaft 40 through a third linkage bar 47. The anchor element 43 may be a latch hook.

When the portable electronic device and the port replicator are coupled, the portable electronic device rests on the ram member 46 to exert a force from its own weight to turn the transmission shaft 40 through the third linkage bar 47, and in turn drive the anchor element 43, the first and second linkage bars 42 and 45.

The anchor element 43 turns towards the portable electronic device and latches on a corresponding trough (not shown in the drawing) formed on the case of the portable electronic device to anchor the portable electronic device. The first linkage bar 42 is driven by the external force and drives a cam 410 located on the braking device 41 to retract, and passes over another coupling surface of the cam 410. When a user depresses the button 44, it drives the first linkage bar 42, second linkage bar 45, third linkage bar 47 and transmission shaft 40 to move the ram member 46 to push the connector of the port replicator away. Meanwhile, because the external force is absent, the first linkage bar 42 passes over the cam 410 and returns to the original latch surface which prevents the first linkage bar 42 from passing.

Thus the ram member 46 can receive the external force to drive the anchor element 43 to latch the portable electronic device. By depressing the button 44, the anchor element 43 and the ram member 46 may be moved in the reverse direction to push or release the portable electronic device so that it is separated from the port replicator.

The improved port replicator thus constructed can adjust angle conveniently and is simple to fabricate and install. It provides significant benefits over the conventional port replicators.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An improved port replicator for a portable electronic device, comprising:
    an angle adjustment dock having two flanges extended from two separated sides, each of said two flanges having a first bore formed therein, and a connector dock located on one surface thereof to receive transmission signals;
    an anchor dock having a pair of second bores, each corresponding to the first bore of a respective one of said two flanges to couple with the angle adjustment dock; and
    an axle running through the first bores and the second bores, wherein the angle adjustment dock is pivotally coupled with the anchor dock through the axle and turnable about the axle.

2. The improved port replicator of claim 1, wherein the anchor dock has a returning elastic element providing a returning force applied to the angle adjustment dock to turn the same about the axle and return to an initial angle and position.

3. An improved port replicator for a portable electronic device, comprising:
    an angle adjustment dock having two flanges extended from two separated sides, each having a first bore and a connector dock located on one surface thereof to receive transmission signals;
    an anchor dock having a second bore corresponding to the first bore to couple with the angle adjustment dock;
    an axle running through the first bore and the second bore; and
    a latch means located at the bottom of the port replicator to latch and release the portable electronic device, wherein the latch means includes:
    a transmission shaft located on the bottom of the port replicator to be in contact with a braking device through a first linkage bar;
    at least one anchor element mounted on the transmission shaft to execute an anchor and release operation through turning of the transmission shaft;
    a button coupling to the transmission shaft through a second linkage bar to control synchronous movements of the transmission shaft, the first linkage bar and a third linkage bar; and
    at least one ram member coupled on the transmission shaft through the third linkage bar to receive or react the gravity force of the portable electronic device through turning of the transmission shaft.

4. The improved port replicator of claim 3, wherein the braking device includes a cam to couple with a contact surface of the first linkage bar.

5. An improved port replicator for a portable electronic device, comprising:
    an angle adjustment dock having two flanges extended from two separated sides each having a first bore and a connector dock located on one surface thereof to receive transmission signals;
    an anchor dock having a second bore corresponding to the first bore to couple with the angle adjustment dock;
    an axle running through the first bore and the second bore; and
    a latch means located on the bottom of the port replicator to latch and release the portable electronic device, wherein the angle adjustment dock is pivotally coupled with the anchor dock through the axle and turnable about the axle.

6. The improved port replicator of claim 5, wherein the anchor dock has a returning elastic element to provide a returning force applied to the angle adjustment dock to turn the same about the axle and return to an initial angle and position.

7. The improved port replicator of claim 5, wherein the latch means includes:
    a transmission shaft located on the bottom of the port replicator to be in contact with a braking device through a first linkage bar;
    at least one anchor element mounted on the transmission shaft to execute an anchor and release operation through turning of the transmission shaft;
    a button coupling to the transmission shaft through a second linkage bar to control synchronous movements of the transmission shaft, the first linkage bar and a third linkage bar; and
    at least one ram member coupled on the transmission shaft through the third linkage bar to receive or react the gravity force of the portable electronic device through turning of the transmission shaft.

8. The improved port replicator of claim 7, wherein the braking device includes a cam to couple with a contact surface of the first linkage bar.

* * * * *